March 6, 1934. A. DINA 1,949,455

FIRE SHUTTER FOR MOTION PICTURE PROJECTORS

Filed Feb. 1, 1930 4 Sheets-Sheet 1

INVENTOR
Augusto Dina
BY
Howard W. Dix
ATTORNEY

March 6, 1934. A. DINA 1,949,455
FIRE SHUTTER FOR MOTION PICTURE PROJECTORS
Filed Feb. 1, 1930 4 Sheets-Sheet 2

INVENTOR
Augusto Dina
BY
Howard W. Dix
ATTORNEY

March 6, 1934.   A. DINA   1,949,455
FIRE SHUTTER FOR MOTION PICTURE PROJECTORS
Filed Feb. 1, 1930   4 Sheets-Sheet 3

INVENTOR
Augusto Dina
BY
Howard W. Dix
ATTORNEY

March 6, 1934. A. DINA 1,949,455
FIRE SHUTTER FOR MOTION PICTURE PROJECTORS
Filed Feb. 1, 1930 4 Sheets-Sheet 4

INVENTOR
Augusto Dina
BY
Howard W. Dix
ATTORNEY

Patented Mar. 6, 1934

1,949,455

UNITED STATES PATENT OFFICE 1,949,455

FIRE SHUTTER FOR MOTION PICTURE PROJECTORS

Augusto Dina, Elizabeth, N. J., assignor to International Projector Corporation, New York, N. Y., a corporation of Delaware Application February 1, 1930, Serial No. 425,118

3 Claims. (Cl. 88—19.4)

This invention relates to new and useful improvements in ventilating fire shutters particularly adapted for use on motion picture projection machines.

A main object of this invention is to provide a simple, compact, durable, automatic, and efficient shutter device which will act as a shutter and as a ventilating means to cool the projection head and the film at the same time and which will operate quickly, smoothly, and automatically when desired.

A further object is to provide means whereby the shutter will be operated in one instance quickly and smoothly by the wind resistance on its members when the shutter is started but will also be operated by the centrifugal influence on some of its members when started so that the opening of the shutter will be more speedy and certain than before.

Further and more specific objects, features, and advantages will more clearly appear from the detailed description given below when taken in connection with the accompanying drawings which form part of the specification and which illustrate one present preferred form of the invention.

The invention in general contemplates the provision of a shutter device comprising at least two shutter elements each having preferably oppositely disposed series of vanes or blades and relatively movable on a support so that at times they are in registration to act as an ordinary shutter and at other times they are out of registration so as to act as a complete barrier in the path of the projection light. In the form of the invention herein, the plates are moved relative to each other by reason first of the wind pressure against at least one of the members and secondly by reason of the centrifugal action of certain control elements which are associated with one or more of the members to bring about the relative movement at the proper time when the shutter device is put into motion and also as it is stopping or slowing down. This improvement gives a more finished and accurate action with more smoothness in operation and a movement more certain throughout the entire speed range of the device.

The present preferred form of the invention is shown in the drawings, in which.

Figure 1:
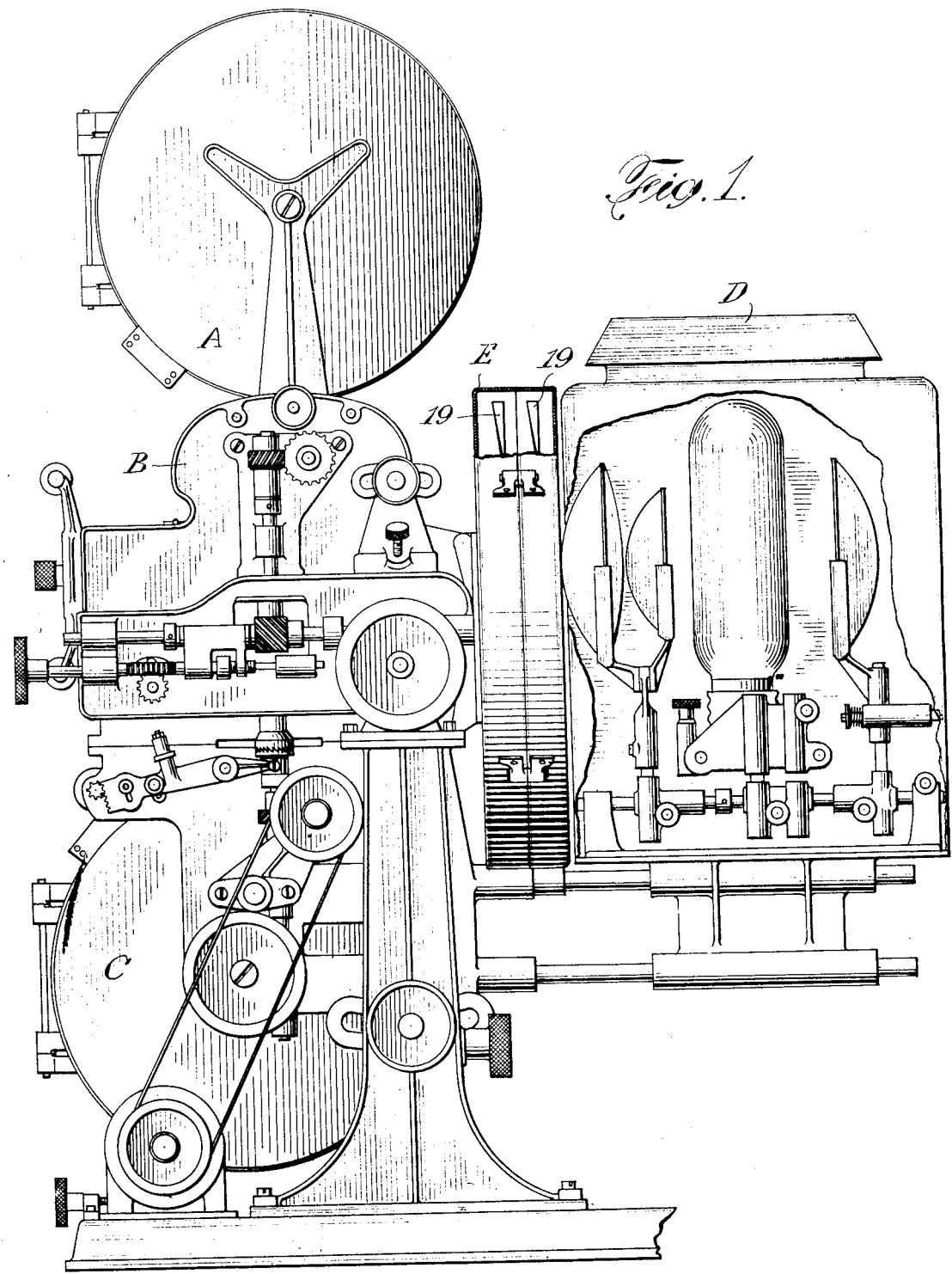
Fig. 1 is a side elevation of the machine to which the shutter is applied and with the shutter guard broken away to show the shutter in position.

The type of ventilating and fire shutter represented by the hereinafter disclosed device is adapted particularly for efficient use on a projector such as that shown in Fig. 1 in which there is disposed a projection head having an upper reel A, a head frame B, a lower reel C, a lamp house D, and an intermediate shutter guard casing E within which is disposed as will be noted in the drawings the shutter between the source of the projection light and the head and the film running therethrough.

Figure 7:
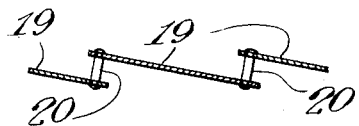
Fig. 7 is a partial cross section through the blades of one of the shutter elements; and, Fig. 8 is a cross section through the blade supporting plates without the blades thereon.
Figure 3:
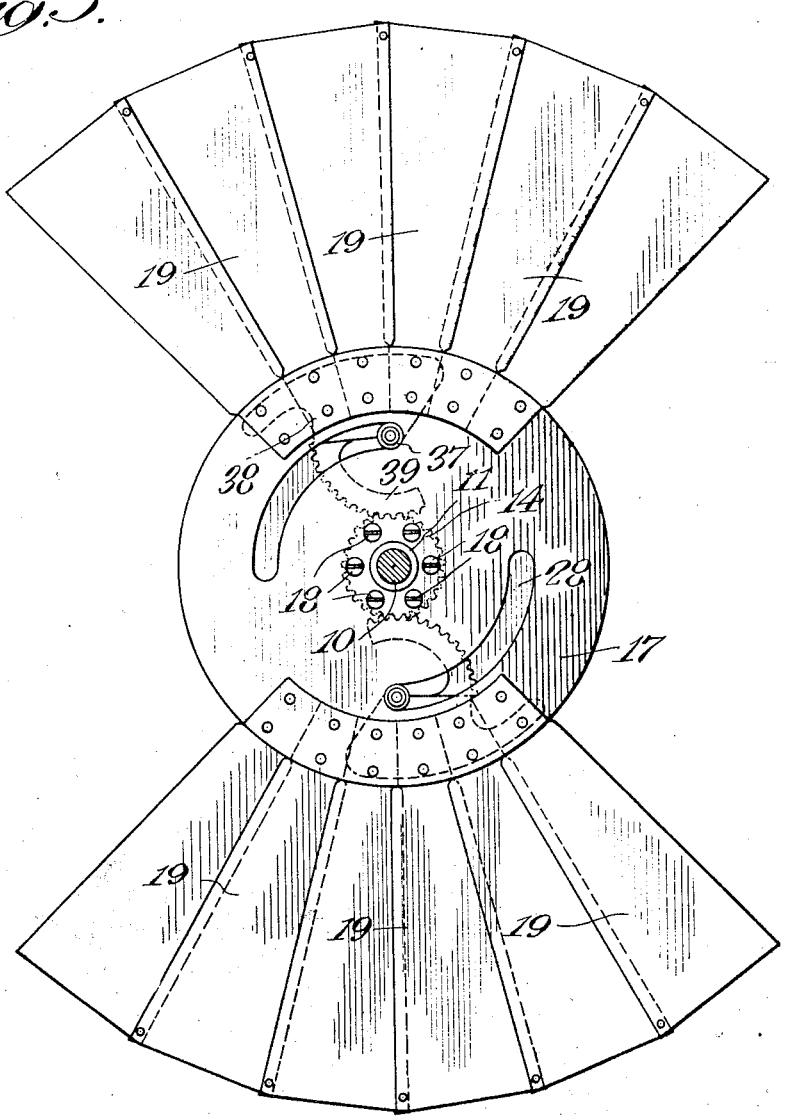
Fig. 3 is a rear elevation of the shutter with the parts in the open position.
Figure 8:
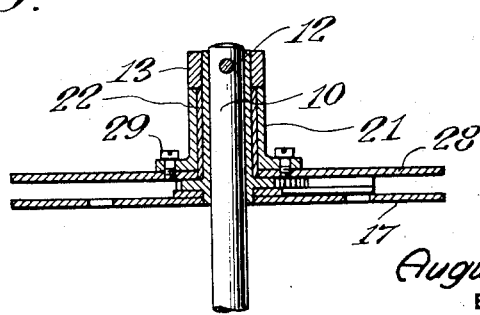

In the drawings the present preferred form of the invention is shown as comprising a shutter shaft 10, to which is fastened a sleeve 11 by means of a screw 12 which also acts to fasten a collar 13 thereto. The sleeve 11 is provided with an upstanding flange 14 with teeth 15 on the periphery thereof. Adjacent the toothed flange 14 is a spacing ring 16 against which a shutter blade-supporting plate 17 is disposed. A screw or screws 18 hold the plate 17 and the ring 16 to the flange 14. Along the periphery of the plate 17 and especially disposed at opposite sides thereof are sets of vanes such as 19, each set acting as a blade of the shutter member. These are attached to the plate 17 in any suitable manner. Reference to Fig. 7 will clearly indicate that these vanes are disposed preferably at a slight angle to each other and spaced apart to form air channels but are lapped over each other to prevent the passage of light between the separate vanes. The vanes are preferably spaced definitely from each other and held in this spaced relation by any suitable means such as pins or studs 20 shown in Fig. 7. As shown in the preferred form there are about six of these vanes in each set of shutter blades, and the plate 17 supports two oppositely disposed sets of these vanes. Between the sets of vanes are openings or gaps which act to permit the passage of the projection light in the usual manner. By having the blades of the shutter formed of a plurality of sets of vanes thus spaced and angularly disposed there is provided the proper ventilating and air channels and the effective depth of the blade along the axis of projection is much smaller than it would be if the blade were of one piece of equal width.

A second shutter blade member is formed adjacent but spaced from the one just described and it is mounted on the sleeve 21 loosely and rotatably supported around the sleeve 11 with an intervening sleeve ring 22 therebetween. One end of the sleeve 21 abuts the collar 13 and the other end of the sleeve 21 has an upstanding flange plate 23 thereon with oppositely extending arms 24 and 25 having bosses 26 and 27 with apertures therein. Disposed against the front face of the plate 23 is a shutter blade supporting plate 28 and held thereto by means of screws 29. The plate 28 has along its periphery oppositely disposed sets of vanes such as 19 similar to those above mentioned on the periphery of the plate 17 and disposed and arranged in a like manner and for the same purposes.

Figure 2:
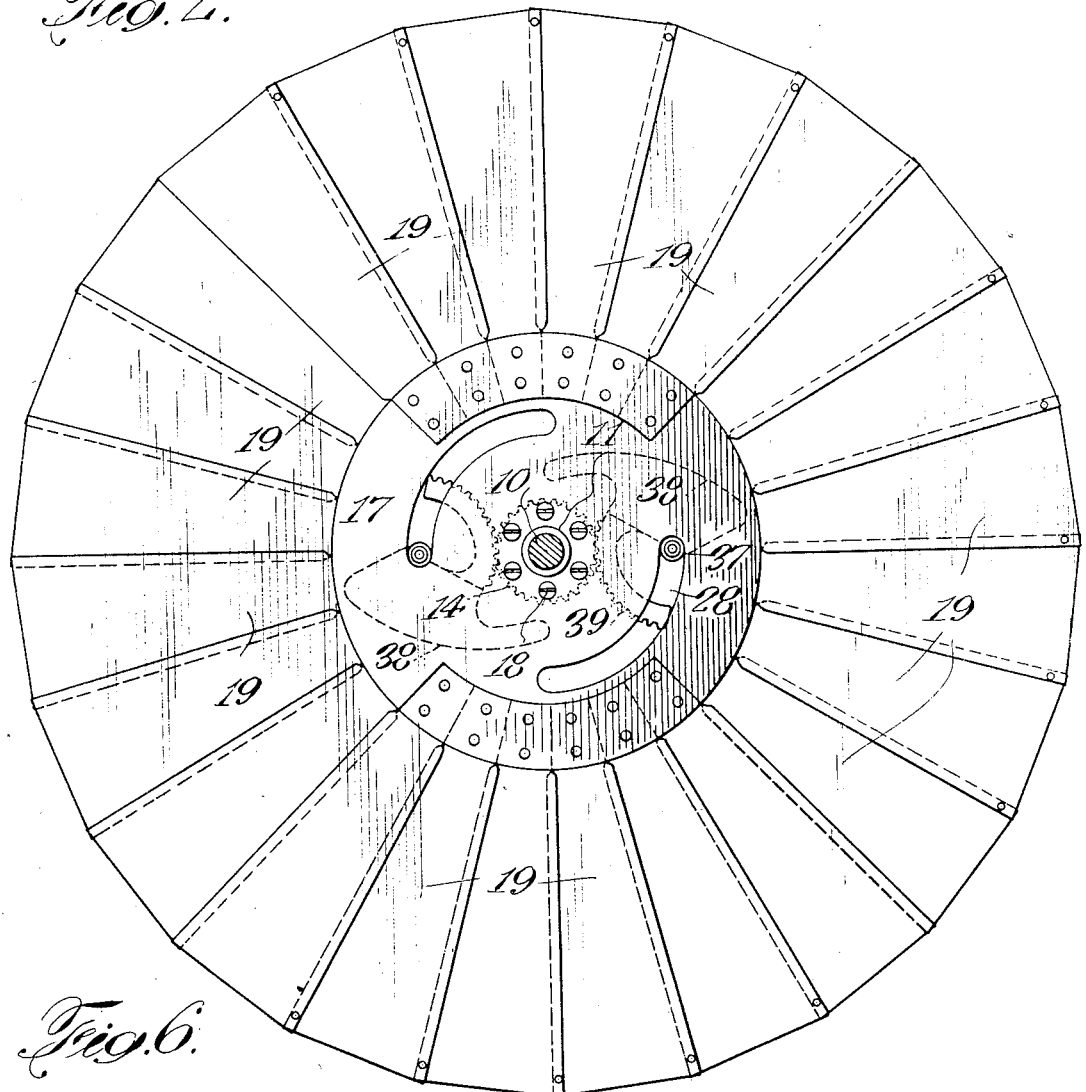
Fig. 2 is a rear elevation of the shutter in the closed position of its parts.
Figure 6:
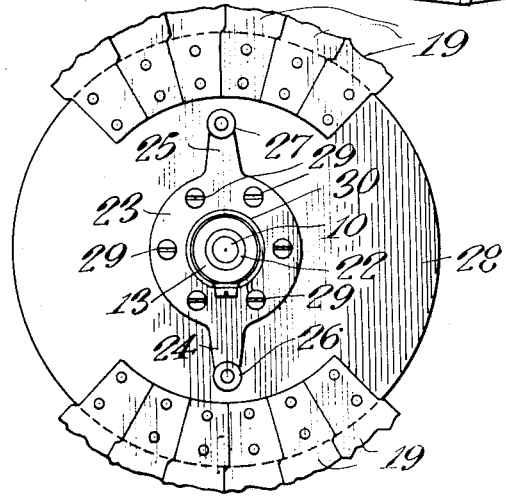
Fig. 6 is a front elevation, in reduced size, of the shutter with the parts in open position.

A spring 30 surrounds the sleeve 21 and is coiled with one end held under the screw 12 on the collar 13 and with its other end held under the screw 29 on the arm 24. This spring 30 has the tendency to force the plate 28 to such a position, when the shutter is running very slow or has stopped, that the sets of vanes or blades thereon are disposed as shown in Fig. 2 in which the sets of vanes or blades on plate 28 are disposed in alinement with the gaps between the similar sets of vanes or blades on the plate 17 and thus the sets of vanes on the two plates 17 and 28 form a complete barrier to the passage of projection light and heat to the head and the film since in the use of this type of shutter it is preferably altho not necessarily disposed between the source of the projection light and the film and the projection head.

Figure 5:
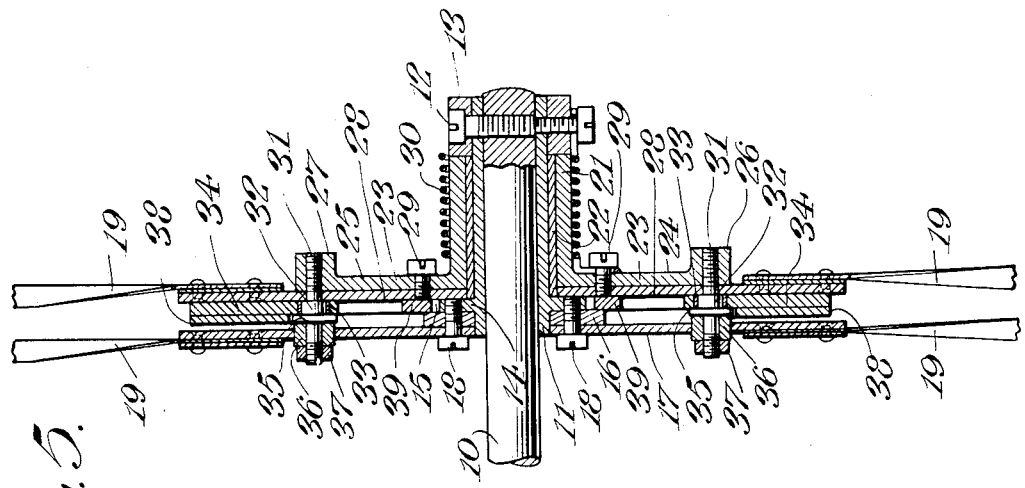
Fig. 5 is a vertical longitudinal section taken through the shutter with the elements in their open position.

When the shutter shaft 10 is caused to move, and as its speed increases the pressure of the air on the vanes of the plate 28 will tend to retard them and, against the action of the spring 30, will force them back to the position shown in Fig. 5 where they are registered and alined with the vanes and blades of the other plate 17 and thus form the usual pair of openings through which the projection light may pass and permit the device to act as a projection shutter.

In order to increase this opening action of the plate 28 and its vanes or blades when the shutter shaft is started and to make it more certain and smooth and accurate and proportional to the speed of the shaft 10, there has been provided a control device which is responsive to centrifugal force. To this end the bosses 26 and 27 above mentioned have bores in which are seated the ends of stub shafts 31 each of which just in front of the plate 28 is enlarged as at 32 to receive a ring sleeve 33 and act as a bearing for the opening in a centrifugally operated wing plate or element 34. The stub shafts just beyond these plates or wings 34 have retaining flanges 35 which hold the wing elements in place. Beyond this point the stub shafts 31 are reduced to the normal diameter and receive collars 36 thereon which slide in grooves curved in the plate 17 as shown. The ends of the stub shafts 31 are threaded to receive retaining and clamping nuts 37.

Figure 4:
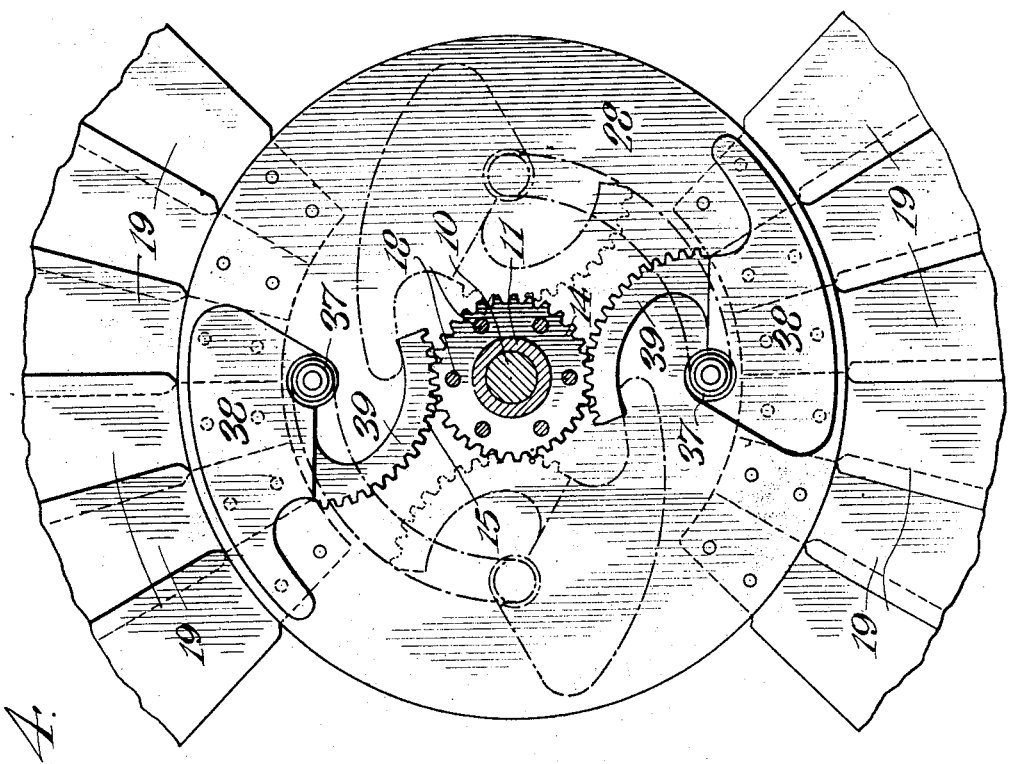
Fig. 4 is an enlarged similar view of the face of one of the elements of the shutter.

As shown in Figs. 4 and 5 the faces of the wing elements 34 are provided with similarly shaped portions such as 38 to act as weights for increasing the centrifugal effectiveness. The wing elements 34 are provided with curved toothed racks such as 39 which are respectively adapted to mesh with the teeth on the periphery of the flange 14 above mentioned. This construction is clearly shown in Fig. 4.

In considering the operation of the device, it is to be noted that when the shutter shaft 10 is at rest, the parts are in the position noted particularly in Fig. 2 and that in this position the two shutter members are so relatively disposed that the sets of vanes or blades thereon are out of alinement to such an extent as to form a complete barrier to the projection light. In this position of the blades, the wing elements 34 which respond to centrifugal force are in the position shown in the dotted lines in Fig. 2. However, as soon as the shutter shaft 10 starts to turn, two factors start to work, namely, first the wind pressure on the vanes of the plate 28, and, secondly, the centrifugal force on the wing elements 34 which are attached to and pivoted on the plate 28 and geared up to the flange 14 associated with the plate 17. As the speed increases, the centrifugal force and the air pressure increases to such an extent that they both exceed the strength of the spring 30 which tends to keep the plate 29 in the position shown in Fig. 2. When this point in the relation of the opposing forces is reached, the plate 28 starts to move from its normal position under these two influences. As the wing elements 34 start to rotate and their centrifugal forces increase, they tend to swing around their pivot points, and since they are meshed with a gear fixed to the shaft 10 the result is that as their swing increases, the plate 28 is forced to move with relation to the plate 17 to the position shown in Fig. 5 which is the position reached by the plate 28 when the speed of the shutter shaft 10 gets above a certain predetermined value. During this time the rack members 39 have been rolling slowly and gradually further around on the teeth on the flange 14 until the wing elements are brought to the position shown in full lines in Fig. 4 where the plate 28 is registered just back of the plate 17 and the shutter device acts as a shutter to permit the projection of light through the openings formed therebetween.

Similarly, as the speed of the shutter shaft 10 decreases, the air pressure on the vanes 19 will decrease and the centrifugal force on the wing elements decreases and the spring force will gradually overcome these two forces and move the plate 28 back to its normal position shown in Fig. 2.

Thus, it will be noted, that there has been provided a simple, compact, efficient, and durable device which will cause two shutter blades and plates to relatively move so that in one position they will completely bar the passage of light for projection and in another position will properly act as the usual shutter for the projection of light and motion pictures. The plates are so constructed and operated that when they are set in motion, the air pressure and the centrifugal force called into play will move them relatively to each other and when the speed is reduced toward zero the centrifugal and air action recedes and a spring action will force them to normal again and automatically. The addition of the centrifugally operated elements to the system has made the action smoother and more certain and more proportionate to the speed at all speeds and therefore the speed adjustment may now be used to more accurately determine the opening of the plates than ever before.

While the invention has been described in detail and with respect to a present preferred form thereof, it is not to be limited to such details and forms since many changes and modifications may be made and the invention embodied in other forms and modifications without departing from the spirit and scope of the invention in its broadest aspects. Hence it is desired to cover any and all forms and modifications of the invention which may come within the language or scope of any one or more of the appended claims.

What is claimed is:

1. A shutter for projection machines which comprises a shutter shaft, a shutter member fixed thereto, another shutter member rotatably disposed on the shaft, a spring means associated with the second shutter member and tending to hold it in a normal relation with the shaft and the first shutter member when the shaft is running below a predetermined speed, pivoted centrifugally operated elements on the second shutter member, said pivoted elements connected to fixed elements on the shaft and adapted to move the second member when the speed of the shaft exceeds a predetermined minimum.

2. A shutter for projection machines which comprises a shutter shaft, a shutter member fixed thereto, another shutter member rotatably disposed on the shaft, a spring means associated with the second shutter member and tending to hold it in a normal relation to the shaft and the first shutter member when the shaft is running below a predetermined speed, wing elements pivoted to the second shutter element, rack elements on the wing elements, a gear element fixed to the shaft and engaging with the rack elements, said wing elements moving under the action of centrifugal force when the speed of the shaft exceeds a predetermined minimum to move the second shutter member to a predetermined relative position with respect to the first member.

3. A shutter for projection machines which comprises a shutter shaft, a shutter member fastened thereon and rotatable with the shaft, a second shutter member loosely rotatable on the shaft and movable relative to the first shutter member, spring means connected between the second shutter member and the shaft tending to hold it in a normal position relative to the first shutter member when the first shutter member is running below a predetermined speed, centrifugally operated weight elements mounted on the second shutter member, said weight elements having gear portions thereon, and a gear on the first shutter member cooperating with the gear portions of the weight elements on the second shutter member to move said second shutter member to a predetermined position other than normal and against the action of said spring when the speed of the shaft exceeds a predetermined minimum.

AUGUSTO DINA.